US012559814B2

(12) United States Patent
Kang et al.

(10) Patent No.: US 12,559,814 B2
(45) Date of Patent: Feb. 24, 2026

(54) HIGH-STRENGTH HOT-DIP GALVANIZED STEEL SHEET HAVING EXCELLENT SURFACE QUALITY AND SPOT WELDABILITY, AND MANUFACTURING METHOD THEREFOR

(71) Applicant: POSCO Co., Ltd, Pohang-si (KR)

(72) Inventors: Ki-Cheol Kang, Gwangyang-si (KR);
Dae-Young Kang, Gwangyang-si (KR);
Nam-A Kim, Gwangyang-si (KR);
Myung-Soo Kim, Gwangyang-si (KR)

(73) Assignee: POSCO CO., LTD, Pohang-si (KR)

( * ) Notice: Subject to any disclaimer, the term of this
patent is extended or adjusted under 35
U.S.C. 154(b) by 10 days.

(21) Appl. No.: 18/267,364

(22) PCT Filed: Dec. 7, 2021

(86) PCT No.: PCT/KR2021/018406

§ 371 (c)(1),
(2) Date: Jun. 14, 2023

(87) PCT Pub. No.: WO2022/139250

PCT Pub. Date: Jun. 30, 2022

(65) Prior Publication Data

US 2024/0011120 A1      Jan. 11, 2024

(30) Foreign Application Priority Data

Dec. 21, 2020    (KR) ........................ 10-2020-0180290

(51) Int. Cl.
| | |
|---|---|
| *B32B 15/01* | (2006.01) |
| *C21D 1/18* | (2006.01) |
| *C21D 1/74* | (2006.01) |
| *C21D 1/84* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C21D 8/0278* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/60* | (2006.01) |
| *C23C 2/02* | (2006.01) |
| *C23C 2/06* | (2006.01) |
| *C23C 2/28* | (2006.01) |
| *C23C 2/40* | (2006.01) |

(52) U.S. Cl.
CPC .............. *C21D 9/46* (2013.01); *B32B 15/013*
(2013.01); *C21D 1/18* (2013.01); *C21D 1/74*
(2013.01); *C21D 1/84* (2013.01); *C21D 6/002*
(2013.01); *C21D 6/005* (2013.01); *C21D
6/008* (2013.01); *C21D 8/0205* (2013.01);
*C21D 8/0226* (2013.01); *C21D 8/0263*
(2013.01); *C21D 8/0278* (2013.01); *C22C
38/002* (2013.01); *C22C 38/008* (2013.01);
*C22C 38/02* (2013.01); *C22C 38/04* (2013.01);
*C22C 38/06* (2013.01); *C22C 38/12* (2013.01);
*C22C 38/14* (2013.01); *C22C 38/22* (2013.01);
*C22C 38/26* (2013.01); *C22C 38/28* (2013.01);
*C22C 38/32* (2013.01); *C22C 38/34* (2013.01);
*C22C 38/38* (2013.01); *C22C 38/60* (2013.01);
*C23C 2/02* (2013.01); *C23C 2/0222* (2022.08);
*C23C 2/0224* (2022.08); *C23C 2/024*
(2022.08); *C23C 2/06* (2013.01); *C23C 2/28*
(2013.01); *C23C 2/40* (2013.01); *C21D
2211/005* (2013.01)

(58) Field of Classification Search
None
See application file for complete search history.

(56) References Cited

U.S. PATENT DOCUMENTS

| | | | |
|---|---|---|---|
| 10,196,727 B2 * | 2/2019 | Takagi | .................. C21D 6/008 |
| 10,407,760 B2 * | 9/2019 | Azuma | ................. C23C 2/0224 |
| 2013/0071687 A1 | 3/2013 | Takagi et al. | |

(Continued)

FOREIGN PATENT DOCUMENTS

| | | |
|---|---|---|
| EP | 2578718 A1 | 4/2013 |
| EP | 2762600 A1 | 8/2014 |

(Continued)

OTHER PUBLICATIONS

Japanese Office Action dated Oct. 22, 2024 issued in Japanese
Patent Application No. 2023-537362 (with English translation).

(Continued)

*Primary Examiner* — Daniel J. Schleis
(74) *Attorney, Agent, or Firm* — Morgan Lewis &
Bockius LLP

(57)            ABSTRACT

According to one aspect of the present invention, a high-
strength hot-dip galvanized steel sheet having an excellent
surface quality and spot weldability, and a manufacturing
method therefor may be provided.

10 Claims, No Drawings

(56) References Cited

U.S. PATENT DOCUMENTS

| | | | |
|---|---|---|---|
| 2014/0234657 A1* | 8/2014 | Azuma | C23C 2/40 |
| | | | 148/522 |
| 2014/0377582 A1 | 12/2014 | Azuma et al. | |
| 2016/0312329 A1 | 10/2016 | Hasegawa et al. | |
| 2018/0312954 A1 | 11/2018 | Yasui et al. | |
| 2018/0371570 A1 | 12/2018 | Kim et al. | |
| 2020/0157671 A1 | 5/2020 | Jin et al. | |
| 2022/0042155 A1 | 2/2022 | Kang et al. | |
| 2022/0056564 A1 | 2/2022 | Kang et al. | |

FOREIGN PATENT DOCUMENTS

| | | | |
|---|---|---|---|
| JP | 2003-073772 A | 3/2003 | |
| JP | 2012-12703 A | 1/2012 | |
| JP | 2017-002384 A | 1/2017 | |
| KR | 10-2011-0119285 A | 11/2011 | |
| KR | 10-2013-0006507 A | 1/2013 | |
| KR | 10-2014-0081617 A | 7/2014 | |
| KR | 10-1622063 B1 | 5/2016 | |
| KR | 10-2016-0098381 A | 8/2016 | |
| KR | 10-2017-0071658 A | 6/2017 | |
| KR | 10-2020-0003174 A | 1/2020 | |
| KR | 10-2020-0076772 A | 6/2020 | |
| KR | 10-2020-0076796 A | 6/2020 | |
| WO | 2013/047820 A1 | 4/2013 | |
| WO | 2016/072477 A1 | 5/2016 | |
| WO | 2017/145329 A1 | 8/2017 | |
| WO | 2020/130631 A1 | 6/2020 | |

OTHER PUBLICATIONS

International Search Report dated Apr. 13, 2022, issued in International Patent Application No. PCT/KR2021/018406 (with English translation).

The Extended European Search Report dated May 14, 2024 issued in European Patent Application No. 21911317.2.

Japanese Office Action dated Jul. 8, 2025 issued in Japanese Patent Application No. 2023-537362 (with English translation).

Indian Office Action dated Jan. 7, 2026 issued in Indian Patent Application No. 202317046319 (with English translation).

* cited by examiner

HIGH-STRENGTH HOT-DIP GALVANIZED STEEL SHEET HAVING EXCELLENT SURFACE QUALITY AND SPOT WELDABILITY, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2021/018406, filed on Dec. 7, 2021, which in turn claims the benefit of Korean Application No. 10-2020-0180290, filed on Dec. 21, 2020, the disclosures of which applications are incorporated by reference herein.

TECHNICAL FIELD

The present disclosure relates to a high-strength hot-dip galvanized steel sheet having excellent surface quality and spot weldability, and a manufacturing method therefor.

BACKGROUND ART

Due to problems such as environmental pollution, regulations on automobile exhaust gas and fuel efficiency are being strengthened day by day. As a result, demand for reducing fuel consumption through weight reduction of automobile steel sheets is increasing, and thus, various types of high-strength steel sheets having high strength per unit thickness are being developed and released.

High-strength steel usually means steel having a strength of 490 MPa or more, but is not necessarily limited thereto, but may include transformation induced plasticity (TRIP) steel, twin induced plasticity (TWIP) steel, dual phase (DP) steel, complex phase (CP) steel, etc.

Meanwhile, automotive steel is supplied in the form of a plated steel sheet whose surface is plated to secure corrosion resistance. Among them, galvanized steel sheet (GI steel sheet), highly corrosion-resistant plated steel sheet (ZM) or alloyed galvanized steel sheet (GA) are widely used as automobile materials because they have high corrosion resistance by using sacrificial properties of zinc.

However, when the surface of the high-strength steel sheet is plated with zinc, there is a problem in that spot weldability may be reduced. That is, since the high-strength steel has high tensile strength and yield strength, the high-strength steel is highly likely to generate microcracks on the surface because it is difficult to relieve tensile stress generated during welding through plastic deformation. When welding is performed on a high-strength galvanized steel sheet, zinc with a low melting point penetrates into the microcracks in the steel sheet to cause a phenomenon called liquid metal embrittlement (LME), resulting in a problem in that the steel plate is destroyed in a fatigue environment. This may act as a major obstacle to increasing the strength of the steel plate.

In addition, alloy elements such as Si, Al, and Mn contained in a large amount in the high-strength steel sheet diffuse to a surface of a steel sheet during the manufacturing process to form surface oxides. As a result, there is a risk of deteriorating the surface quality such as occurrence of non-plating due to a large decrease in the wettability of zinc.

DISCLOSURE

Technical Problem

The present disclosure provides a high-strength hot-dipped galvanized steel sheet having excellent surface quality and spot weldability, and a manufacturing method therefor.

The subject of the present disclosure is not limited to the above. A person skilled in the art will have no difficulty understanding the further subject matter of the present disclosure from the general content of this specification.

Technical Solution

In an aspect in the present disclosure, a galvanized steel sheet may include: a base steel sheet; and a zinc-based plating layer provided on a surface of the base steel sheet, in which the base steel sheet may include: a first surface layer region that is a region corresponding to a depth of 25 μm in a thickness direction of the base steel sheet from an interface between the base steel sheet and the zinc-based plating layer; and a second surface layer region that is adjacent to the first surface layer region and corresponds to a depth of 25 μm to 50 μm in the thickness direction of the base steel sheet, and a fraction of ferrite contained in the first surface layer region may be 55 area % or more, and an average grain size of ferrite contained in the first surface layer region may be 2 to 10 μm, and a fraction of ferrite contained in the second surface layer region may be 30 area % or more, and an average grain size of ferrite contained in the second surface layer region may be 1.35 to 7 μm.

A ratio of an average hardness of the first surface layer region to an average hardness of a central portion of the base steel sheet may be 90% or less, and a ratio of an average hardness of the second surface layer region to the average hardness of the central portion of the base steel sheet may be 95% or less.

A plating adhesion amount of the zinc-based plating layer may be 30 to 70 $g/m^2$.

The base steel sheet may contain a composition containing, by wt %, C: 0.05 to 1.5%, Si: 2.5% or less, Mn: 1.5 to 20.0%, S—Al (acid-soluble aluminum): 3.0% or less, Cr: 2.5% or less, Mo: 1.0% or less, B: 0.005% or less, Nb: or less, Ti: 0.2% or less, Sb+Sn+Bi: 0.1% or less, N: or less, and a balance of Fe and unavoidable impurities.

A tensile strength of the galvanized steel sheet may be 900 MPa or more.

A surface layer portion of the base steel sheet may contain oxide containing at least one of Si, Mn, Al, and Fe.

A thickness of the base steel sheet may be 1.0 to 2.0 mm.

In another aspect in the present disclosure, a method for manufacturing a galvanized steel sheet may include: reheating a steel slab to a temperature range of 950 to 1300° C.; providing a hot-rolled steel sheet by hot rolling the reheated slab at a finish rolling start temperature of 900 to 1150° C. and a finish rolling end temperature of 850 to 1050° C.; coiling the hot-rolled steel sheet in a temperature range of 590 to 750° C.; heating the hot-rolled steel sheet in a heating zone at a heating rate of 1.3 to 4.3° C./s; annealing the hot-rolled steel sheet in a soaking zone having a dew point temperature of −10 to +30° C., an atmosphere gas of $N_2$-5 to 10% $H_2$, and a temperature range of 650 to 900° C.; slowly cooling the annealed hot-rolled steel sheet in a slow cooling zone in a temperature range of 550 to 700° C.; quenching the slowly cooled hot-rolled steel sheet in a quenching zone in a temperature range of 270 to 550° C.; forming a zinc-based plating layer by reheating the quenched hot-rolled steel sheet and then immersing the reheated quenched hot-rolled steel sheet in a zinc-based plating bath at a lead in temperature of 420 to 550° C.; and optionally alloying the steel sheet, on which the zinc-based plating layer is formed, by heating the steel sheet to a temperature range of 480 to 560° C.

The threading speed may be 40 to 130 mpm during the annealing.

The steel slab may contain a composition containing, by wt %, C: 0.05 to 0.30%, Si: 2.5% or less, Mn: 1.5 to 10.0%, S—Al (acid-soluble aluminum): 1.0% or less, Cr: 2.0% or less, Mo: 0.2% or less, B: 0.005% or less, Nb: or less, Ti: 0.1% or less, Sb+Sn+Bi: 0.05% or less, N: or less, and a balance of Fe and unavoidable impurities.

The means for solving the above problems do not enumerate all the features of the present disclosure, and the various features of the present disclosure and the advantages and effects thereof will be understood in more detail with reference to the specific embodiments below.

Advantageous Effects

As set forth above, according to an embodiment of the present disclosure, since a ferrite crystal grain size of a surface layer portion of a base iron directly below a plating layer is controlled within a certain range, the possibility of cracking may be reduced even if tensile stress is applied during spot welding. As a result, it is possible to effectively reduce a phenomenon of liquid metal embrittlement (LME) caused by penetration of a hot-dip galvanized layer along cracks.

According to one aspect of the present disclosure, it is possible to reduce the formation of oxides on the surface of the steel sheet, and as a result, it is possible to effectively suppress the deterioration in plating quality.

Effects of the present disclosure are not limited to the above, and may be interpreted as including technical effects that can be inferred from the details described below by those skilled in the art.

BEST MODE

The present disclosure relates to a high-strength hot-dip galvanized steel sheet having excellent surface quality and spot weldability, and a manufacturing method therefor. Hereinafter, exemplary embodiments in the present disclosure will be described. Implementation embodiments of the present disclosure may be modified into several forms, and it is not to be interpreted that the scope of the present disclosure is limited to exemplary embodiments described in detail below. These exemplary embodiments are provided to explain the present disclosure in more detail to those skilled in the art to which the present disclosure pertains.

Hereinafter, a galvanized steel sheet of the present disclosure will be described through several implementation embodiments.

It should be noted that the term galvanized steel sheet in the present disclosure includes not only a galvanized steel sheet (GI steel sheet) but also an alloyed galvanized steel sheet (GA), and includes all plated steel sheets having a zinc-based plating layer mainly containing zinc. The fact that zinc is mainly included means that a ratio of zinc is the highest among elements included in a plating layer. However, in an alloyed galvanized steel sheet, a ratio of iron may be higher than that of zinc, and a steel sheet having the highest ratio of zinc among the rest components other than iron may be included in the scope of the present disclosure.

The inventors of the present disclosure focused on the fact that liquid metal embrittlement (LME) generated during welding is caused by microcracks generated from a surface of a steel sheet, studied a means of inhibiting the microcracks on the surface, and found that it was necessary to specifically control a microstructure of the surface of the steel sheet, leading to the present disclosure.

In general, in the case of high-strength steel, a large amount of elements such as carbon (C), manganese (Mn), and silicone (Si), may be included in order to secure hardenability or austenite stability of the steel. These elements serve to increase susceptibility to cracking in the steel. Therefore, microcracks easily occur in steel containing a large amount of these elements, ultimately causing liquid metal embrittlement during welding.

The present inventors have conducted in-depth research on ways to reduce crack susceptibility of high-strength steel, and since the generation behavior of microcracks is closely related to a distribution of carbon (C) in a steel sheet, when ferrite with a relatively low carbon (C) concentration is introduced into a surface layer portion of a steel sheet, derived the fact that the crack susceptibility of the steel sheet may be effectively reduced. In particular, the present inventors have derived the present disclosure by identifying that there is a close correlation between a fraction or grain size of ferrite and crack generation behavior in a specific region of a surface layer portion of a steel sheet.

According to one implementation example of the present disclosure, a galvanized steel sheet may include: a base steel sheet; and a zinc-based plating layer provided on a surface of the base steel sheet, in which the base steel sheet may include: a first surface layer region that is a region corresponding to a depth of 25 μm in a thickness direction of the base steel sheet from an interface between the base steel sheet and the zinc-based plating layer; and a second surface layer region that is adjacent to the first surface layer region and corresponds to a depth of 25 μm to 50 μm in the thickness direction of the base steel sheet, and a fraction of ferrite contained in the first surface layer region may be 55 area % or more, and an average grain size of ferrite contained in the first surface layer region may be 2 to 10 μm, and a fraction of ferrite contained in the second surface layer region may be 30 area % or more, and an average grain size of ferrite contained in the second surface layer region may be 1.35 to 7 μm.

According to an example, a surface layer portion of a steel sheet adjacent to a zinc-based plating layer may be divided into a first surface layer region and a second surface layer region. The first surface layer region may be a region corresponding to a depth of 25 μm in the thickness direction of the base steel sheet from the interface between the base steel sheet and the zinc-based plating layer. The second surface layer region may be adjacent to the first surface layer region and correspond to a depth of 25 μm to 50 μm in the thickness direction of the base steel sheet.

The microstructure of the first surface layer region may be composed of ferrite and a secondary hard phase, and may include other unavoidable structures. Since the first surface layer region contains 55 area % or more of ferrite, the crack susceptibility of the steel sheet may be effectively reduced. The upper limit of the fraction of the ferrite contained in the first surface layer region is not particularly defined, but the upper limit may be limited to 97 area % in terms of securing the strength of the steel sheet. The secondary hard phase refers to a microstructure having relatively high hardness compared to ferrite, and may be at least one selected from bainite, martensite, retained austenite, and pearlite.

An average grain size of ferrite contained in the first surface layer region may range from 2 μm to 10 μm. In order to inhibit the crack susceptibility of the steel sheet, the average grain size of the ferrite contained in the first surface layer region may be limited to 2 μm or more. On the other hand, when the average grain size of the ferrite contained in the first surface layer region exceeds a certain level, it is disadvantageous in terms of securing the strength of the steel sheet, so the average grain size of the ferrite contained in the first surface layer region may be limited to 10 μm or less.

The fraction and average grain size of the ferrite contained in the first surface layer area adjacent to the zinc-based plating layer, as well as the fraction and the average grain size of the ferrite contained in the second surface layer area spaced away from the zinc-based plating layer by a certain distance are also factors that greatly affect the crack susceptibility of the steel sheet.

The microstructure of the second surface layer region may also be composed of ferrite and a secondary hard phase, and may include other unavoidable structures. Since the second surface layer region contains 30 area % or more of ferrite, the crack susceptibility of the steel sheet may be effectively reduced. The upper limit of the fraction of the ferrite contained in the second surface layer region is not particularly defined, but the upper limit may be limited to 85 area % in terms of securing the strength of the steel sheet. The secondary hard phase refers to a microstructure having relatively high hardness compared to ferrite, and may be at least one selected from bainite, martensite, retained austenite, and pearlite.

An average grain size of ferrite contained in the second surface layer region may range from 1.35 μm to 7 μm. In order to inhibit the crack susceptibility of the steel sheet, the average grain size of the ferrite contained in the second surface layer region may be limited to 1.35 μm or more. On the other hand, when the average grain size of the ferrite contained in the second surface layer region exceeds a certain level, it is disadvantageous in terms of securing the strength of the steel sheet, so the average grain size of the ferrite contained in the second surface layer region may be limited to 7 μm or less.

The average grain sizes of the ferrite contained in the first surface layer region and the second surface layer region may be measured by observing three or more regions of the cross section of the steel sheet with scanning electron microscopy (SEM), and the fractions of the ferrites contained in the first surface layer region and the second surface layer region may be measured using a phase map secured using electron back-scattered diffraction (EBSD). A person skilled in the art may measure the fractions and average grain sizes of the ferrites contained in the first surface layer region and the second surface layer region without any special technical difficulties.

In order to provide a buffering force against the tensile stress generated during spot welding, the first surface layer region and the second surface layer region preferably have a lower hardness than the central portion of the base steel sheet. The ratio of the average hardness of the first surface layer region to the average hardness of the central portion of the base steel sheet may be 90% or less, and the ratio of the average hardness of the second surface layer region to the average hardness of the central portion of the base steel sheet may be 95% or less. The second surface layer region may have a higher average hardness value than the first surface layer region. The lower limits of the ratio of the average hardness of the first surface layer region to the average hardness of the central portion of the base steel sheet or the ratio of the average hardness of the second surface layer region to the average hardness of the central portion of the base steel sheet are not particularly specified, but the lower limits may be limited to 70%, respectively, in terms of securing the strength of the steel sheet and securing material uniformity.

The average hardness of the first surface layer region refers to an average of Vickers hardness values measured at points 5 μm, 10 μm, 15 μm, and 20 μm away from the interface in the cross section of the steel sheet, and the average hardness of the second surface layer region refers to the average of the Vickers hardness values measured at points 30 μm, 35 μm, 40 μm, 45 μm away from the interface in the cross section of the steel sheet. The average hardness of the central portion means the average of the Vickers hardness values measured at $\frac{1}{2}$t point and $\frac{1}{2}$t±5 μm point, respectively, in the cross section of the steel sheet. Here, t means the thickness (mm) of the steel sheet. The Vickers hardness may be measured under a 5 g load condition using a nanointentional Vickers hardness tester, and those skilled in the art measures the average Vickers hardnesses of the first surface layer area, the second surface layer area, and the central portion without special technical difficulties.

When the present disclosure is a high-strength steel sheet having a strength of 900 MPa or more, the type is not limited. However, it is not necessarily limited thereto, but the steel sheet targeted in the present disclosure may contain, by wt %, C: 0.05 to 1.5%, Si: 2.5% or less, Mn: 1.5 to 20.0%, S—Al (acid-soluble aluminum): 3.0% or less, Cr: 2.5% or less, Mo: 1.0% or less, B: 0.005% or less, Nb: 0.2% or less, Ti: 0.2% or less, Sb+Sn+Bi: 0.1% or less, N: 0.01% or less, and the balance being Fe and unavoidable impurities. In some cases, elements that are not listed above but may be included in the steel may be further included up to 1.0 wt % or less in total. In the present disclosure, the content of each component element is represented based on weight unless otherwise specified. The above-described composition means the bulk composition of the steel sheet, that is, the composition at a ¼ point of the thickness of the steel sheet (hereinafter, the same).

However, in some implementation examples of the present disclosure, TRIP steel, DP steel, CP steel, and the like may be targeted as the high-strength steel sheet. These steels may have the following composition when classified in detail.

Steel composition 1: C: 0.05 to 0.30% (preferably to 0.25%), Si: 0.5 to 2.5% (preferably 1.0 to 1.8%), Mn: 1.5 to 4.0% (preferably 2.0 to 3.0%), S—Al: 1.0% or less (preferably 0.05% or less), Cr: 2.0% or less (preferably 1.0% or less), Mo: 0.2% or less (preferably 0.1% or less), B: or less (preferably 0.004% or less), Nb: 0.1% or less (preferably 0.05% or less), Ti: 0.1% or less (preferably to 0.05%), Sb+Sn+Bi: 0.05% or less, N: 0.01% or less, and the balance being Fe and unavoidable impurities. In some cases, elements that are not listed above but may be included in the steel may be further included up to 1.0% or less in total.

Steel composition 2: C: 0.05 to 0.30% (preferably 0.10 to 0.2%), Si: 0.5% or less (preferably 0.3% or less), Mn: 4.0 to 10.0% (preferably 5.0 to 9.0%), S—Al: 0.05% or less (preferably 0.001 to 0.04%), Cr: 2.0% or less (preferably 1.0% or less), Mo: 0.5% or less (preferably 0.1 to 0.35%), B: 0.005% or less (preferably 0.004% or less), Nb: 0.1% or less (preferably 0.05% or less), Ti: 0.15% or less (preferably 0.001 to 0.1%), Sb+Sn+Bi: 0.05% or less, N: 0.01% or less, balance Fe, and unavoidable impurities. In some cases, elements that are not listed above but may be included in the steel may be further included up to 1.0% or less in total.

In addition, when the lower limit of the content of each of the above-described component elements is not limited, these elements may be regarded as arbitrary elements, and mean that the content may be 0%.

Although not necessarily limited thereto, the thickness of the base steel sheet according to one implementation embodiment of the present disclosure may be 1.0 to 2.0 mm.

In addition, the plated steel sheet according to one implementation embodiment of the present disclosure may have improved surface quality by containing an internal oxide containing at least one of Si, Mn, Al and Fe in the surface layer portion of the base steel sheet. That is, the formation of the oxides on the surface of the steel sheet may be inhibited by the presence of the oxides in the surface layer portion, and as a result, good plating performance may be obtained by securing wettability between the base steel sheet and the plating solution during plating.

According to one implementation embodiment of the present disclosure, one or more plating layers may be included on the surface of the steel sheet, and the plating layer may be a zinc-based plating layer that includes a galvanized (GI) or galvannealed (GA) layer. In the present disclosure, as described above, since the fraction and average grain size of the ferrite contained in the surface layer portion are controlled to be within an appropriate range, even if the zinc-based plating layer is formed on the surface of the steel sheet, it is possible to effectively prevent the liquid metal embrittlement occurring during spot welding.

According to one implementation embodiment of the present disclosure, when the zinc-based plating layer is the GA layer, the alloying degree (meaning the Fe content in the plating layer) may be controlled to be 8 to 13 wt %, and preferably 10 to 12 wt %. When the alloying degree is not sufficient, zinc in the zinc-based plating layer may penetrate into microcracks and cause the problems of the liquid metal embrittlement. Conversely, when the alloying degree is too high, problems such as powdering may occur.

In addition, the plating adhesion amount of the zinc-based plating layer may be 30 to 70 $g/m^2$. When the plating adhesion amount is too small, it is difficult to obtain sufficient corrosion resistance. On the other hand, when the plating adhesion amount is too large, the manufacturing costs may increase and the liquid metal embrittlement may occur. Therefore, the plating adhesion amount is controlled to be within the range described above. A more preferable range of the plating adhesion amount may be 40 to 60 $g/m^2$. The plating adhesion amount refers to the amount of plating layer attached to a final product, and when the plating layer is the GA, since the plating adhesion amount increases due to alloying, the weight may decrease slightly before alloying, and the weight is not necessarily limited thereto since it depends on the alloying degree, but the adhesion amount before alloying (i.e., the amount of plating attached from the plating bath) may be reduced by about 10%.

Hereinafter, one implementation example of manufacturing the steel sheet of the present disclosure will be described. However, it is necessary to note that the steel sheet of the present disclosure does not necessarily have to be manufactured by the following implementation examples, and the following implementation examples are one preferred method for manufacturing the steel sheet of the present disclosure.

First, a steel slab having the above composition may be reheated, hot rolled through rough rolling and finish rolling, subjected to run out table (ROT) cooling, and then coiled, to thereby manufacturing a hot rolled steel sheet. Thereafter, pickling may be performed and cold rolling on the manufactured steel sheet, and the obtained cold rolled steel sheet may be annealed and plated. Hot rolling conditions such as the ROT cooling are not particularly limited, but in one implementation example of the present disclosure, slab heating temperature, finish rolling start and end temperature, coiling temperature, pickling conditions, cold rolling conditions, annealing conditions, and plating conditions may be limited as follows.

Slab Heating Temperature: 950 to 1300° C.

Slab heating is performed to secure rollability by heating a material before hot rolling. During the slab reheating, the surface layer portion of the slab combines with oxygen in the furnace to form oxide scale. When the scale is formed, it also reacts with carbon in steel to cause a decarburization reaction to form carbon monoxide gas, and the higher the slab reheating temperature, the higher the amount of decarburization. When the slab reheating temperature is excessively high, there is a problem in that a decarburized layer is excessively formed and the material of the final product is softened. Conversely, when the slab reheating temperature is excessively low, since hot rollability may not be secured, edge cracks may occur and the hardness of the surface layer portion may not be sufficiently lowered, so the LME improvement is insufficient.

Finish Rolling Start Temperature: 900 to 1150° C.

When the finish rolling start temperature is excessively high, the surface hot-rolled scale may be excessively developed and the amount of surface defects caused by the scale of the final product may increase, so the upper limit is limited to 1,150° C. In addition, when the finish rolling start temperature is less than 900° C., the rigidity of a bar increases due to the decrease in temperature, so the hot rollability may be greatly reduced, to thereby limit the finish rolling start temperature to the above range.

Finish Rolling End Temperature: 850 to 1050° C.

When the finish rolling end temperature exceeds 1,050° C., the scale removed by descaling during finish rolling is excessively formed on the surface again, increasing the occurrence amount of surface defects, and when the finish rolling end temperature is less than 850° C., the hot rollability is lowered, so the finish rolling end temperature may be limited to the above range.

Coiling Temperature: 590 to 750° C.

The hot-rolled steel sheet is coiled in the form of a coil and stored, and the coiled steel sheet is subjected to a slow cooling process. Hardenable elements included in the surface layer portion of the steel sheet are removed by this process. When the coiling temperature of the hot-rolled steel sheet is too low, it is difficult to achieve sufficient effect because the coil is slowly cooled at a temperature lower than the temperature required to oxidize and remove these elements.

Pickling Treatment: Perform at a Threading Speed of 180 to 250 mpm

In order to remove the scale of the hot-rolled steel sheet that has undergone the above-described process, the hot-rolled steel sheet is put in a hydrochloric acid bath and subjected to the pickling treatment. During pickling, the pickling treatment is performed in a hydrochloric acid concentration of the hydrochloric acid bath which is in the range of 10 to 30%, and the pickling threading speed is performed at 180 to 250 mpm. When the pickling speed exceeds 250 mpm, the surface scale of the hot-rolled steel sheet may not be completely removed, and when the pickling speed is lower than 180 mpm, the surface part of the base iron may be corroded by hydrochloric acid, so the pickling treatment is performed at 180 mpm or more.

Cold Rolling Reduction Rate: 35 to 60%

After pickling, the cold rolling is performed. During cold rolling, the cold reduction rate is performed in the range of 35 to 60%. When the cold reduction rate is less than 35%, there is no particular problem, but it may be difficult to sufficiently control a microstructure due to insufficient recrystallization driving force during annealing. When the cold reduction rate exceeds 60%, the thickness of the soft layer obtained during hot rolling becomes thin, making it difficult to lower the hardness within a sufficient area within 20 μm of the surface of the steel sheet after annealing.

After the above-described cold rolling process, a process of annealing the steel sheet may be followed. Since the average grain size and fraction of the ferrite on the surface of the steel sheet may vary greatly even during the annealing process of the steel sheet, in one implementation embodiment of the present disclosure, the annealing process may be controlled under the conditions of appropriately controlling the average grain size and fraction of the ferrite in the area within 50 μm from the surface of the steel sheet.

Threading Speed: 40-130 mpm

In order to secure sufficient productivity, the threading speed of the cold-rolled steel sheet needs to be 40 mpm or more. However, when the threading speed is excessively fast, it may be disadvantageous in terms of securing the material, so, in one implementation embodiment of the present disclosure, the upper limit of the threading speed may be set to 130 mpm.

Heating Zone: Heating Rate of 1.3 to 4.3° C./s

In order to secure the fraction and average grain size of the ferrite contained in the surface layer portion in an appropriate range, it is advantageous to control the heating rate in the heating zone. When the heating rate of the heating zone is low, since the oxidation amount of Si increases in the region of 650° C. or higher, and the oxide film in the form of a continuous film is formed on the surface, the amount of steam dissociated into oxygen in contact with the surface of the steel sheet is significantly reduced, and the oxide film inhibits the reaction between carbon and oxygen on the surface, the decarburization is not sufficiently performed, so the LME resistance may deteriorate. In addition, the oxide film is formed on the surface, resulting in poor plating wettability and poor plating surface quality. Therefore, in one implementation embodiment of the present disclosure, the lower limit of the heating rate of the heating zone may be set to 1.3° C./s.

Meanwhile, when the heating rate in the heating zone is high, the austenite phase transformation may not be smooth in the abnormal temperature range in two phase regions and recrystallization during the heating process. In TRIP steel, in the process of simultaneously forming the ferrite and austenite in the temperature range in the two phase regions, as carbon composed of cementite is dissociated, and partitioning is performed with austenite with high carbon solubility, the carbon solid content increases, so hard low-temperature phases such as martensite become stable. On the other hand, when the heating rate is high, the austenite fraction is lowered, and the low-temperature phase is not sufficiently formed due to the decrease in the carbon partitioning, which may cause the decrease in strength. Therefore, in one implementation embodiment of the present disclosure, the upper limit of the heating rate of the heating zone may be set to 4.3° C./s.

Dew Point Control in Annealing Furnace: Controlled to be within Range of −10 to +30° C. at 650 to 900° C.

It is advantageous to control the dew point in the annealing furnace to obtain the fraction and average grain size of the ferrite within an appropriate range. When the dew point is too low, there is a possibility that oxides such as Si or Mn may be formed on the surface due to the surface oxidation rather than the internal oxidation. These oxides adversely affect plating. Therefore, the dew point needs to be controlled to be −10° C. or higher. Conversely, when the dew point is too high, the oxidation of Fe may occur, so the dew point needs to be controlled to be 30° C. or lower. As such, the temperature for controlling the dew point may be 650° C. or higher, which is a temperature at which a sufficient internal oxidation effect appears. However, when the temperature is too high, surface oxides such as Si are formed to disturb oxygen from diffusing into the inside, and austenite is excessively generated during the heating of the soaking zone to lower the carbon diffusion rate, resulting in lower the internal oxidation level, and the soaking zone austenite size grows excessively, resulting in material softening. In addition, since the load of the annealing furnace may be generated to shorten the life of the equipment and increasing the process cost, the temperature for controlling the dew point may be 900° C. or less.

In this case, the dew point may be controlled by introducing moist nitrogen ($N_2$+$H_2O$) containing water vapor into the annealing furnace.

Hydrogen Concentration in Annealing Furnace: 5 to 10 vol %

The atmosphere in the annealing furnace maintains a reducing atmosphere by adding 5 to 10 vol % hydrogen to nitrogen gas. When the hydrogen concentration in the annealing furnace is less than 5 vol %, the surface oxides are excessively formed due to the decrease in reducing ability, so the surface quality and plating adhesion deteriorate, and the surface oxides inhibit the reaction between oxygen and carbon in steel, so the amount of decarburization decreases and the LME improvement level decreases. When the hydrogen concentration is high, no special problem occurs, but since the cost increases due to the increase in the amount of hydrogen gas used and there is a risk of explosion in the furnace due to the increase in hydrogen concentration, the hydrogen concentration needs to be limited.

The steel sheet annealed by the above process may be cooled through slow cooling and quenching steps.

Temperature of Slow Cooling Zone During Slow Cooling: 550 to 750° C.

The slow cooling zone refers to the section where the cooling rate is 3 to 5° C./s. When the temperature of the slow cooling zone exceeds 750° C., the soft ferrite is excessively formed during the slow cooling and the tensile strength decreases. Conversely, when the temperature of the slow cooling zone is less than 550° C., bainite may be excessively formed or martensite may be formed, so the tensile strength may excessively increase and the elongation may decrease. Therefore, the temperature of the slow cooling zone may be limited to the above range.

Temperature of Quenching Zone During Quenching: 270 to 550° C.

The quenching zone refers to the section where the cooling rate is 12 to 20° C./s. When the temperature of the quenching zone exceeds 550° C., the tensile strength is insufficient due to the formation of the martensite of the proper level or less during quenching, and when the temperature of the quenching zone is less than 270° C., the formation of the martensite may be excessive and the elongation may be insufficient.

The steel sheet annealed by this process is immediately immersed in a plating bath and subjected to hot-dip galvanizing. When the steel sheet is cooled, a step of heating the steel sheet may be further included. The heating temperature needs to be higher than the lead in temperature of the steel sheet to be described later, and in some cases, may be higher than the temperature of the plating bath.

Lead in Temperature of Steel Sheet in the Plating Bath: 420 to 500° C.

When the lead in temperature of the steel sheet in the plating bath is low, the wettability in the contact interface between the steel sheet and liquid zinc is not sufficiently secured, so it needs to be kept above 420° C. There is a problem in that, when the lead in temperature is excessively high, the reaction between the steel sheet and the liquid zinc is excessive, and thus a zetta phase, which is an Fe—Zn alloy phase occurs at the interface, resulting in lowering the adhesion of the plating layer, and dross occurs in the plating bath due to excessive elution of steel sheet Fe element in the plating bath. Therefore, the lead in temperature of the steel sheet may be limited to 500° C. or less.

Al Concentration in Plating Bath: 0.10 to 13.0%

The Al concentration in the plating bath needs to be maintained at an appropriate concentration to secure the wettability of the plating layer and the fluidity of the plating bath. The Al concentration should be controlled to be 0.10 to 0.15% for GA, 0.2 to 0.25% for GI, and 0.7 to 13.0% for ZM to keep the dross formation in the plating bath at an appropriate level and to secure the plating surface quality and performance.

The hot-dip galvanized steel sheet plated by the above process may then undergo the alloying heat treatment process, if necessary. Preferred conditions for the alloying heat treatment are as follows.

Alloying (GA) Temperature: 480 to 560° C.

When the alloying temperature is less than 480° C., the alloying degree is insufficient due to the small amount of Fe diffusion, which may lead to poor plating properties. When the alloying temperature exceeds 560° C., a powdering problem may occur due to excessive alloying, and the material may be deteriorated due to ferrite transformation of retained austenite, so the alloying temperature is set within the above-described range.

MODE FOR INVENTION

Hereinafter, the present disclosure will be described in more detail with reference to Examples. However, it should be noted that the following Examples are only for illustrating the present disclosure in more detail and are not intended to limit the scope of the present disclosure.

Example

A steel slab having compositions shown in Table 1 below (the remaining components not listed in the table are Fe and unavoidably included impurities. In addition, in the table, B and N were expressed in ppm units, and the remaining components were expressed in units of wt %) was heated to 1230° C., hot rolled at finish rolling start and end temperatures of 1015° C. and 950° C., respectively, and then coiled at 630° C. Thereafter, pickling with 19.2 vol % of hydrochloric acid solution followed by cold rolling, and the obtained cold-rolled steel sheet was annealed in an annealing furnace, slowly cooled at 4.2° C./s in a slow cooling zone of 620° C., and quenched at 17° C./s in a quenching zone of 315° C., to thereby obtain an annealed steel sheet. The atmospheric gas in the soaking zone was $N_2$-6% $H_2$. Thereafter, the obtained steel sheet was heated, and GA was immersed in a plating bath having 0.13% of Al, GI was immersed in a zinc-based plating bath having 0.24 wt % of Al, and ZM was immersed in a zinc-based plating bath having 1.75% of Al and 1.55% of Mg to perform hot-dip galvanizing. The obtained hot-dip galvanized steel sheet was subjected to alloying (GA) heat treatment at 520° C., if necessary, to finally obtain the alloying hot-dip galvanized steel sheet.

In all examples, the lead in temperature of the steel sheet drawn into the hot-dip galvanizing bath was set to be 475° C. Other conditions for each Example were as described in Table 2.

TABLE 1

| Steel | Alloy composition (wt %) | | | | | | | | | | | |
|---|---|---|---|---|---|---|---|---|---|---|---|---|
| type | C | Si | Mn | S · Al | Cr | Mo | B | Nb | Ti | Sb | Sn | Bi |
| A | 0.175 | 1.542 | 2.14 | 0.00124 | 0.145 | 0 | 12 | 0 | 0.012 | 0 | 0 | 0 |
| B | 0.214 | 1.454 | 2.325 | 0.0014 | 0 | 0 | 10 | 0 | 0.022 | 0 | 0 | 0 |
| C | 0.181 | 1.124 | 2.235 | 0.00122 | 0 | 0.014 | 9 | 0.012 | 0.032 | 0.015 | 0 | 0 |
| D | 0.1252 | 1.021 | 23.54 | 0.00124 | 0 | 0 | 0 | 0 | 0.014 | 0 | 0.021 | 0 |
| E | 0.178 | 2.96 | 2.354 | 0.0027 | 0.457 | 0.0475 | 11 | 0.05 | 0.032 | 0 | 0 | 0.012 |
| F | 0.223 | 3.13 | 2.456 | 0.0012 | 0 | 0 | 8 | 0.012 | 0.021 | 0 | 0 | 0 |
| G | 0.187 | 1.524 | 2.543 | 0.0014 | 0 | 0 | 7 | 0.01 | 0.027 | 0.012 | 0 | 0 |

TABLE 2

| Steel type | Specimen No. | Plating type | Heating rate of heating zone (° C./s) | Temperature of cracking zone (° C.) | Temperature of slow cooling zone (° C.) | Temperature of quenching zone (° C.) | Dew point of cracking zone (° C.) |
|---|---|---|---|---|---|---|---|
| G | 1 | GA | 1.6 | 917 | 594 | 290 | 6.4 |
| B | 2 | GA | 1.8 | 821 | 654 | 315 | 10.5 |
| E | 3 | GI | 1.9 | 812 | 610 | 324 | 12.5 |
| C | 4 | GI | 2.3 | 854 | 617 | 375 | 4.2 |

TABLE 2-continued

| Steel type | Specimen No. | Plating type | Heating rate of heating zone (° C./s) | Temperature of cracking zone (° C.) | Temperature of slow cooling zone (° C.) | Temperature of quenching zone (° C.) | Dew point of cracking zone (° C.) |
|---|---|---|---|---|---|---|---|
| G | 5 | ZM | 2.7 | 817 | 620 | 350 | 8.5 |
| A | 6 | ZM | 2.1 | 836 | 627 | 384 | −4.3 |
| B | 7 | GI | 2.1 | 795 | 607 | 458 | 5.1 |
| F | 8 | GI | 1.9 | 832 | 645 | 398 | 11.2 |
| A | 9 | GA | 1.7 | 664 | 614 | 272 | 24.5 |
| B | 10 | GA | 2.6 | 814 | 607 | 375 | 12.4 |
| G | 11 | GA | 2.4 | 754 | 604 | 542 | 10.6 |
| C | 12 | GA | 2.5 | 642 | 575 | 367 | 7.2 |
| D | 13 | ZM | 3.3 | 841 | 542 | 357 | 14.2 |
| C | 14 | GA | 3.5 | 841 | 621 | 345 | 18.4 |
| C | 15 | GA | 4.1 | 823 | 594 | 324 | 17.5 |
| C | 16 | GI | 1.6 | 834 | 617 | 547 | −21 |
| A | 17 | GA | 4.5 | 845 | 621 | 321 | 10.3 |
| B | 18 | GA | 1.1 | 825 | 617 | 319 | 11.2 |

The characteristics of the hot-dip galvanized steel sheet manufactured by the above-described process were measured, and the results of observing whether or not liquid metal embrittlement (LME) occurred during spot welding were shown in Table 3. The spot welding was performed by cutting the steel sheet in a width direction along each cut edge. A spot welding current was applied twice and a hold time of 1 cycle was maintained after a current was applied. The spot welding was performed in dissimilar 3 sheets. Material for evaluation-material for evaluation-GA 980DP 1.4t material (having compositions of 0.12 wt % of C, 0.1 wt % of Si, and 2.2 wt % of Mn) was laminated in order and spot welding was performed. After a new electrode was welded to a soft material 15 times during the spot welding, the electrode was worn, and then the upper limit current at which expulsion occurred with the spot welding target material was measured. After measuring the upper limit current, the spot welding was performed 8 times for each welding current at a current lower than the upper limit current by 0.5 and 1.0 kA, and a cross section of the spot welded zone was precisely processed by electric discharge machining, and epoxy mounted and polished, and a length of cracks was measured with an optical microscope. When observing with the optical microscope, the magnification was set to 100 times, and if no cracks were found at that magnification, it was determined that the liquid metal embrittlement had not occurred, and if cracks were found, the length was measured with image analysis software. B-type cracks occurring at a shoulder portion of the spot welded zone were determined to be good when it was 100 μm or less and C-type cracks were determined to be good when not observed.

The microstructure fraction was measured using an electron back-scattered diffraction (EBSD) phase map for the cross section of each specimen. In addition, the cross section of each specimen was performed on nital etching and analyzed with the scanning electron microscopy (SEM), and the average grain size of ferrite was measured using three or more photographs of each specimen.

The Vickers hardness of each specimen section was measured under a 5 g load condition using a nanointention Vickers hardness tester. The average hardness of the first surface layer region is an average value of the Vickers hardness measured at points 5 μm, 10 μm, 15 μm, and 20 μm away from the interface, the average hardness of the second surface layer region is an average value of the Vickers hardness measured at points 30 μm, 35 μm, 40 μm, and 45 μm away from the interface, and the average hardness of the central portion is an average value of the Vickers hardness measured at points $\frac{1}{2}$t and $\frac{1}{2}$t±5 μm, respectively.

The tensile strength was measured through a tensile test by making a C-direction sample of the JIS-5 standard. The plating adhesion amount was measured using a wet dissolution method using a hydrochloric acid solution. For sealer adhesion, an automotive structural adhesive D-type was bonded to a plating surface and then the steel sheet was bent at 90° to check whether the plating was removed. For powdering, after bending the plating material at 90°, the tape was adhered to the bent area and then removed to confirm how many mm the plating layer was removed from the tape. When the length of the plating layer peeled off from the tape exceeded 10 mm, it was confirmed as defective. After flaking was processed in a 'U' shape, it was checked whether the plating layer was removed from the processed part. For GI and ZM steel sheets, a sealer bending test (SBT) was performed to check whether the plating layer was peeled off and attached to the surface where the sealer was removed when the steel sheet was bent at 90° by attaching an adhesive for automobile structure to the surface. The surface quality was confirmed by visually checking whether there were any defects such as the unplating of the steel sheet, and when defects such as the unplating were observed with the naked eye, the steel sheet was determined to be defective.

TABLE 3

| | First surface layer region (0-25 μm) | | | Second surface layer region (25~50 μm) | | |
|---|---|---|---|---|---|---|
| Specimen No. | Fraction of ferrite (area %) | Average size of ferrite (μm) | Ratio of hardness compared to central portion (%) | Fraction of ferrite (area %) | Average size of ferrite (μm) | Ratio of hardness compared to central portion (%) |
| 1 | 47 | 1.4 | 94 | 28 | 1.2 | 99 |
| 2 | 65 | 3.2 | 88 | 51 | 2.8 | 93 |
| 3 | 52 | 1.3 | 91 | 26 | 1.1 | 96 |
| 4 | 67 | 3.1 | 87 | 54 | 2.7 | 92 |
| 5 | 70 | 5.2 | 80 | 57 | 4.5 | 84 |
| 6 | 65 | 3.6 | 88 | 52 | 3.1 | 93 |
| 7 | 74 | 4.8 | 82 | 61 | 4.2 | 86 |
| 8 | 45 | 1.3 | 93 | 21 | 1.1 | 98 |
| 9 | 72 | 3.8 | 72 | 59 | 3.3 | 76 |
| 10 | 64 | 3.2 | 84 | 51 | 2.8 | 88 |
| 11 | 70 | 4.3 | 71 | 57 | 3.8 | 75 |
| 12 | 48 | 1.3 | 93 | 29 | 1.1 | 98 |
| 13 | 45 | 1.2 | 92 | 22 | 1.0 | 97 |
| 14 | 65 | 3.5 | 81 | 52 | 3.1 | 85 |
| 15 | 72 | 3.5 | 81 | 59 | 3.1 | 85 |
| 16 | 45 | 1.3 | 95 | 28 | 1.1 | 100 |
| 17 | 65 | 2.7 | 89 | 60 | 2.4 | 94 |
| 18 | 47 | 1.0 | 98 | 37 | 0.8 | 99 |

TABLE 4

| | Plating | | | | | | LME occurrence | |
|---|---|---|---|---|---|---|---|---|
| Specimen No. | Tensile strength (MPa) | adhesion amount (wt %) | Surface quality | Powdering (mm) | Flaking | SBT | B-type length (μm) | C-type length (μm) |
| 1 | 787 | 49 | Bad | 11 | Peeling | — | 35 | 365 |
| 2 | 1204 | 47 | Good | 4 | Good | — | 45 | ND |
| 3 | 1301 | 57 | Bad | — | — | Peeling | 14 | 452 |
| 4 | 1021 | 55 | Good | — | — | Good | 27 | ND |
| 5 | 945 | 42 | Good | — | — | Good | 24 | ND |
| 6 | 1182 | 40 | Good | — | — | Good | 84 | ND |
| 7 | 1210 | 42 | Good | — | — | Good | ND | ND |
| 8 | 1302 | 56 | Bad | — | — | Peeling | 25 | 248 |
| 9 | 1145 | 41 | Good | 2 | Good | — | 41 | ND |
| 10 | 1192 | 49 | Good | 4 | Good | — | 14 | ND |
| 11 | 994 | 42 | Good | 4 | Good | — | 35 | ND |
| 12 | 674 | 47 | Good | 1 | Good | — | 74 | 398 |
| 13 | 954 | 41 | Bad | — | — | Peeling | 23 | 654 |
| 14 | 1003 | 48 | Good | 1 | Good | — | 75 | ND |
| 15 | 1032 | 45 | Good | 2 | Good | — | 95 | ND |
| 16 | 774 | 57 | Bad | — | — | Peeling | 21 | 374 |
| 17 | 692 | 45 | Good | 3 | Good | — | 34 | ND |
| 18 | 1184 | 43 | Bad | 14 | Peeling | — | 240 | 532 |

Specimens 2, 4, 5, 6, 7, 9, 10, 11, 14, and 15 satisfy the alloy composition and process conditions of the present disclosure, and it can be confirmed that the tensile strength, plating quality, and spot welding LME crack length are good. On the other hand, specimens 1, 3, 8, 12, 13, 16, 17, and 18 do not satisfy any one of the alloy composition and process conditions of the present disclosure, and it may be confirmed that any one or more of tensile strength, plating quality, and spot welding LME crack deteriorates.

Although the present disclosure has been described in detail through embodiments above, other types of embodiments are also possible. Therefore, the spirit and scope of the claims set forth below are not limited to the embodiments.

The invention claimed is:

1. A galvanized steel sheet, comprising:
a base steel sheet; and
a zinc-based plating layer provided on a surface of the base steel sheet, wherein the base steel sheet includes:
a first surface layer region that is a region corresponding to a depth of 25 μm in a thickness direction of the base steel sheet from an interface between the base steel sheet and the zinc-based plating layer; and
a second surface layer region that is adjacent to the first surface layer region and corresponds to a depth of 25 μm to 50 μm in the thickness direction of the base steel sheet, and a fraction of ferrite contained in the first surface layer region is 55 area % or more, and an average grain size of ferrite contained in the first surface layer region is 2 to 10 μm, and a fraction of ferrite contained in the second surface layer region is 30 area % or more, and an average grain size of ferrite contained in the second surface layer region is 1.35 to 7 μm.

2. The galvanized steel sheet of claim 1, wherein a ratio of an average hardness of the first surface layer region to an average hardness of a central portion of the base steel sheet is 90% or less, and a ratio of an average hardness of the second surface layer region to the average hardness of the central portion of the base steel sheet is 95% or less.

3. The galvanized steel sheet of claim 1, wherein a plating adhesion amount of the zinc-based plating layer is 30 to 70 g/m$^2$.

4. The galvanized steel sheet of claim 1, wherein the base steel sheet contains a composition containing, by wt %, C: 0.05 to 1.5%, Si: 2.5% or less, Mn: 1.5 to 20.0%, S—Al (acid-soluble aluminum): 3.0% or less, Cr: 2.5% or less, Mo: 1.0% or less, B: 0.005% or less, Nb: 0.2% or less, Ti: 0.2% or less, Sb+Sn+Bi: 0.1% or less, N: 0.01% or less, and a balance of Fe and unavoidable impurities.

5. The galvanized steel sheet of claim 4, wherein a tensile strength of the galvanized steel sheet is 900 MPa or more.

6. The galvanized steel sheet of claim 4, wherein a surface layer portion of the base steel sheet contains oxide containing at least one of Si, Mn, Al, and Fe.

7. The galvanized steel sheet of claim 1, wherein a thickness of the base steel sheet is 1.0 to 2.0 mm.

8. A method for manufacturing a galvanized steel sheet, comprising:

reheating a steel slab to a temperature range of 950 to 1300° C.;

providing a hot-rolled steel sheet by hot rolling the reheated slab at a finish rolling start temperature of 900 to 1150° C. and a finish rolling end temperature of 850 to 1050° C.;

coiling the hot-rolled steel sheet in a temperature range of 590 to 750° C.;

heating the hot-rolled steel sheet in a heating zone at a heating rate of 1.3 to 4.3° C./s;

annealing the hot-rolled steel sheet in a soaking zone having a dew point temperature of −10 to +30° C., an atmosphere gas of N$_2$-5 to 10% H$_2$, and a temperature range of 650 to 900° C.;

slowly cooling the annealed hot-rolled steel sheet in a slow cooling zone in a temperature range of 550 to 700° C.;

quenching the slowly cooled hot-rolled steel sheet in a quenching zone in a temperature range of 270 to 550° C.;

forming a zinc-based plating layer by reheating the quenched hot-rolled steel sheet and then immersing the reheated quenched hot-rolled steel sheet in a zinc-based plating bath at a lead in temperature of 420 to 550° C.; and optionally alloying the steel sheet, on which the zinc-based plating layer is formed, by heating the steel sheet to a temperature range of 480 to 560° C.

9. The method of claim 8, wherein a threading speed is 40 to 130 mpm during the annealing.

10. The method of claim 8, wherein the steel slab contains a composition containing, by wt %, C: 0.05 to 0.30%, Si: 2.5% or less, Mn: 1.5 to 10.0%, S-AI (acid-soluble aluminum): 1.0% or less, Cr: 2.0% or less, Mo: 0.2% or less, B: 0.005% or less, Nb: 0.1% or less, Ti: 0.1% or less, Sb+Sn+Bi: 0.05% or less, N: 0.01% or less, and a balance of Fe and unavoidable impurities.

\* \* \* \* \*